United States Patent Office 3,223,161
Patented Dec. 14, 1965

3,223,161
METHOD FOR CONSOLIDATING LOOSE SANDY MATERIAL
Leonard L. Burge, Tulsa, Okla., assignor to Sinclair Research, Inc., a corporation of Delaware
No Drawing. Filed Aug. 22, 1961, Ser. No. 133,062
12 Claims. (Cl. 166—33)

This invention relates to a method for consolidating loose, sandy material and is particularly concerned with a method employing a vaporous catalytic agent to copolymerize an aqueous solution of resin-forming material in the sandy material to consolidate the material while leaving the resulting consolidated mass permeable. This method has particular utility in the well-treating field, e.g. in input and producing wells as well as in secondary recovery operations wherein saindy subterranean formations penetrated by a well bore can be consolidated and left permeable to facilitate the recovery of oil.

In the method of the present invention, loose, sandy material composed of particles is consolidated and left permeable by placing a resin-forming mixture into the loose, sandy material in amounts sufficient to wet the external surface of the particles, conducting an inert gas into the sandy material to remove the fluid content to irreducible amounts while leaving the surface of the particles wet with the resinous material, and contacting the loose, sandy material with catalytic amounts of a catalyzing agent in vapor phase, to polymerize the resin-forming material, consolidate the sandy material and provide the permeable consolidated mass.

In the present method which can be employed in a well traversing a subterranean formation containing unconsolidated, loose, sandy material, any liquid e.g. water, present in the sandy material can be blown out with an inert gas prior to the introduction of the resin-forming material to avoid either contaminating or diluting this material. Suitable inert gases include methane, natural gas, nitrogen and air.

Uncatalyzed resin-forming material can be conducted or injected into the formation with a string of tubing to impregnate the formation and is used generally in amounts ranging from about 0.5 to 10 or 15 gallons per vertical foot of formation to be treated and preferably from about 4 to 6 gallons per vertical foot in an open hole and from about 1 to 1.5 gallons per vertical foot per perforation if the formation is lined and perforated. The excess amount of resin-forming material in the formation and any undesirable fluid or liquid materials (e.g. water) in the formation can be removed by displacing such materials, for instance by blowing the materials out of the formation to be treated, with an inert gas. The displacement generally effected is one in which the connate water (earth-laden water normally present around the sand particles in a formation) is removed while at the same time leaving the resin-forming material surrounding the sand grains in an aqueous condition with irreducible water i.e. that water not driven off by the inert gas and which wets the grains of sand in the formation. Suitable inert gases (gases inert under operating conditions) include air, nitrogen, natural gas and methane, and the gases can be employed in amounts ranging from about 200 s.c.f./gal. of aqueous resin-forming material up to amounts which would dehydrate the resin-forming material but preferably from about 300 to 1000 s.c.f./gal. of resin-forming material.

The catalyzing or triggering agent e.g. sulfur dioxide, is preferably employed in the gaseous form and can be carried in a carrier gas, e.g. nitrogen or any other gas which is inert to the sulfur dioxide and will not deleteriously affect the resin-forming material, to contact the resin-forming material, particularly if the pressure is high enough in the area surrounding the sandy material such that a 100% sulfur dioxide gas would be condensed. This can be pointed up by noting the properties for liquid and saturated vapor of sulfur dioxide set forth below:

| Temperature F.: | Pressure, p.s.i.g. |
|---|---|
| 15 | 0.51 |
| 20 | 2.48 |
| 25 | 4.64 |
| 30 | 7.00 |
| 35 | 9.58 |
| 40 | 12.40 |
| 45 | 15.45 |
| 50 | 18.75 |
| 55 | 22.35 |
| 60 | 26.23 |
| 65 | 30.43 |
| 70 | 34.92 |
| 75 | 39.77 |
| 80 | 44.98 |
| 85 | 50.58 |
| 90 | 56.55 |
| 95 | 62.90 |
| 100 | 69.82 |
| 110 | 85.06 |
| 120 | 106.23 |
| 140 | 143.91 |

The sulfur dioxide is provided and contacted with the resin-forming material-impregnated, loose, sandy material in catalytic amounts and these amounts will generally range from about 0.01 to 10, preferably from about 0.1 to 6 weight percent based on the weight of the monomers, i.e. the alkylidene bisacrylamide and ethylenic monomer taking part in the copolymerization.

The liquid resin-forming materials polymerized according to the method of the present invention are particularly suitable for use in the well bore treating field and include an aqueous solution of an alkylidene bisacrylamide and ethylenic comonomer, the bisacrylamide having the formula:

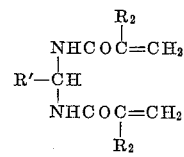

in which

is a hydrocarbon residue of an aldehyde containing, for instance, from about 1 to 10 and preferably from about 1 to 5 carbon atoms, e.g. formalde-, acetalde-, and valeraldehyde; but usually about 1 to 3 carbon atoms; and $R_2$ is a member of the group consisting of hydrogen and a methyl radical.

The other comonomer is a solid, liquid or gaseous ethylenic (i.e. contains at least the $>C=C<$ radical) compound with a solubility of at least about 2 percent by weight, and preferably at least about 5 percent, in water and which copolymerizes with the aforesaid bisacrylamide in an aqueous system. Although not essential in practicing the invention, it is preferred to select an ethylenic comonomer which is preferably soluble or at least self-dispersible in water with appropriate stirring, as such, for example, methylene-bisacrylamide, which is capable of polymerizing.

In addition to the comonomer N,N'-methylenebisacrylamide set out in the examples hereinafter, any of the alkylident bisacrylamides corresponding to the above formula which are described and claimed in Lundberg Patent No. 2,475,846 hereby incorporated by reference, or mixtures thereof may be used as cross-linking agents. Only slight solubility is required of the alkylidene bisacrylamide in view of the small amount used; therefore, this component may have a water solubility as low as about 0.02 percent by weight at 20° C. but a solubility of at least about 0.10 percent is more desirable for general purposes.

A wide variety of ethylenic comonomers or mixtures thereof are copolymerizable with the alkylidene bisacrylamides; those having a formula containing at least one >C=C< group, preferably containing from about 1 to 8 carbon atoms, hereinafter referred to as the ethenoid group, and having appreciable solubility in water are suitable for use in the present invention. See U.S. Patent No. 2,801,985, hereby incorporated by reference. As set forth in this patent, the unsubstituted bonds in the ethenoid group may be attached to one or more of many different atoms or radicals including hydrogen, halogens, such as chlorine and bromine, cyano, aryl, aralkyl, alkyl, and alkylene with or without solubilizing groups attached to these hydrocarbons. In addition, the substituents on the ethenoid group may comprise one or more hydrophilic groups including formyl, methylol, polyoxyalkylene residues and quaternary ammonium salt radicals,

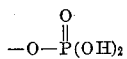

—OOCH; —OOCCH$_3$; —SO$_3$X, where X is H, NH$_4$, an alkali metal or an alkylamine; —CONR$_2$ and —CH$_2$CONR$_2$ where each R is hydrogen, alkylol, lower alkyl or a polyoxyalkylene radical; and —COOR' and —CH$_2$COOR', where R' is a H, NH$_4$, alkali metal, alkaline earth metal, organic nitrogenous base, alkylol, lower alkyl or polyoxyalkylene radical. The large number of combinations and proportions of the various suitable substituents makes it impractical to list all compounds in this category which may be employed. The water solubility of these substances is known to depend chiefly on the number and type of hydrophilic and hydrophobic radicals therein; for example, the solubility of compounds containing an alkyl radical diminishes as the length of the alkyl chain increases and aryl groups tend to decrease water solubility whereas the aforesaid hydrophilic substituents all tend to improve the solubility of a given compound in water. Accordingly, the comonomer should be selected according to chemical practice from those containing sufficient hydrophilic radicals to balance any hydrophobic groups present in order to obtain the requisite water solubility of monomer.

Among the water-soluble ethenoid monomers, those containing an acrylyl or methacrylyl group are especially recommended. These are exemplified by N-methylol acrylamide, calcium acrylate, methacrylamide and acrylamide. Other suitable ethenoid compounds are acrylic acid; other N-substituted acrylamides, such as N-methylacrylamide, N-3-hydroxypropylacrylamide, dimethylamino-propylacrylamide, N-ethylol acrylamide; acrylonitrile; saturated alkyl esters of acrylic acid, i.e. methyl acrylate, β-hydroxyethyl acrylate; ethylene glycol and polyethylene glycol acrylates, an example being the reaction product of β-hydroxyethylacrylate or acrylic acid with about 1 to about 50 mols or more of ethylene oxide; salts of acrylic acid, i.e. magnesium acrylate, sodium acrylate, ammonium acrylate, zinc acrylate, β-amino-ethylacrylate, β-methylamino-ethylacrylate, guanidine acrylate and other organic nitrogenous base salts, such as diethylamine acrylate and ethanolamine acrylate; quaternary salts like alkyl acrylamidopropyl dimethylamino chloride; acrolein, β-carboxyacrolein, butenoic acid; α-chloroacrylic acid; β-chloroacrylic acid; as well as methacrylic acid and its corresponding derivatives.

Maleic acid and its corresponding derivatives including partial esters, partial salts, and ester salts thereof; maleamic, chloromaleic, fumaric, itaconic, citraconic, vinyl sulfonic, and vinyl phosphonic acids and their corresponding derivatives and mixtures thereof. Derivatives of this kind and other suitable compounds include α,β-dichloroacrylonitrile, methacrolein, potassium methacrylate, magnesium methacrylate, hydroxyethyl methacrylate zinc β-chloroacrylate, trimethylamine methacrylate, calcium α-chloromethacrylate, diethyl methylene succinate, methylene succindiamide, monomethyl maleate, maleic diamide methylene maloanamide, diethyl methylene malonate, methyl isopropenyl ketone, ethyl vinyl ketone, propyl vinyl ketone, vinyl formate, vinyl lactate, vinyl acetate, vinyl bromoacetate, vinyl chloroacetate, vinyl pyrrolidone, allyl levulinate, allyl alcohol, methallyl alcohol, diallyl carbonate, allyl lactate, allyl gluconate, di(β-aminoethyl) maleate, di(methylaminoethyl) maleate, di(N,N'-dimethyl-β-aminoethyl) maleate, sulfonated styrene, vinyl pyridine, maleic anhydride, sodium maleate, ammonium maleate, calcium maleate, monopotassium maleate, monoammonium maleate, monomagnesium maleate, methyl vinyl ether, N-aminoethyl maleamide, N-aminoethyl maleimide, alkyl aminoalkyl maleamides, N-vinyl amines, N-allyl amines, heterocyclic ethenoid compounds containing nitrogen in a tertiary amino group, and the amine and ammonium are salts of said cyclic compounds, N-vinyl acetamide, N-vinyl-N-methyl formamide, N-vinyl-N-methylacetamide, N-vinyl succinimide, N-vinyldiformamide, N-vinyl diacetamide, vinyl sulfonyl chloride, vinyl sulfonic acid salts, vinyl sulfonic acid amides, vinyl oxazolidone, allyl amine, diallylamine, vinyl methyl pyridinium chloride, and allyl trimethyl ammonium chloride to name only a few of the operative compounds.

The preferred resin-forming composition employed in the method of the present invention is in an aqueous medium and has an initial viscosity approximating that of water. These compositions can be formed by dissolving a mixture of acrylamide and N,N'-methylene-bisacrylamide in fresh water. Generally, this mixture contains about 1 to 25 weight percent of N,N'-methylenebisacrylamide and about 99 to 75 weight percent of ethylenic monomer e.g. acrylamide. The aqueous solution will usually include from about 5 weight percent of this mixture to its limit of solubility and preferably this amount is about 5 to 25 percent. Although the acrylamide as such is preferred, its nitrogen atom could be substituted as with a hydroxy methyl or a hydroxy ethyl group.

In addition to the above-mentioned ingredients, the resin-forming mixture employed in the process of the present invention may include other components, particularly when they are destined for use in processes for consolidating permeable well areas. Advantageously, one of the components can be an inorganic metal salt to enhance polymerization of the monomers in the resin-forming mixture.

The inorganic metal salts which can be employed in the present invention are the halides of metals of Groups I to III of the periodic table of elements. The halides of halogens having an atomic number from 17 to 35 are preferred. The halides include the alkali and alkaline earth metals halides such as sodium chloride, potassium chloride, magnesium chloride, strontium chloride and calcium chloride as well as their corresponding bromides. Other halides include zinc chloride and aluminum chloride. The halides as specified are not necessarily equivalent from the standpoint of enhancing the polymerization of monomers. Among the halides, calcium chloride and zinc chloride are outstanding in performance, and sodium chloride performs exceptionally well. An inorganic metal salt, e.g. alkaline earth metal salts, e.g. such as their halides, for instance, can be employed in polymerization expediting amounts by adding the salt to the resin-forming mixture. The polymerization expediting amounts are those amounts which will enhance the polymerization rate of the monomers included in the resin-forming mixture and will generally range from about 5–35 or more weight percent for the alkaline earth metal salt based upon the weight of the aqueous resin-forming mixture and salt. For instance, calcium chloride can also be present in amounts ranging from about 5–35 or more (for instance, up to the limit of its solubility in the mixture) weight percent based on the aqueous resin-forming mixture and calcium chloride, to also provide advantageous weighted or specific gravity characteristics for the resin-forming material. It may be desirable to exercise care as to the amount of additive incorporated into the resin-forming material and this will depend upon the specific additive employed. In general, the initial viscosity of the material at the temperatures and pressures encountered in a well bore hole is such that it has the viscosity of up to about 10–15 centipoises, and advantageously up to 5 centipoises at these conditions, which in many cases include temperatures between about 50–200° F. and pressures which can range from about ambient pressures to about 1,000 p.s.i.

Experiments have been conducted to demonstrate the present invention. Results indicate that injection of approximately one and one-half gallons of 20% AM–9 (a mixture of 95% acrylamide and 5% N,N'-methylene bisacrylamide) plus 30% calcium chloride followed by approximately 300 cu. ft. of nitrogen gas and then sufficient sulfur dioxide gas to effect polymerization, through a 5/8" perforation in a casing, will consolidate sufficient sand to prevent sanding problems in a well. Permeability reduction in this test amounted to only about one-fifth the original permeability, consolidation was rather uniform, and very little evidence of gravity segregation of the heavily weighted mix was noted.

The apparatus used for this test was a vessel made from a 12" length of 12" I.D. casing. A plate was welded across the bottom and the top was fitted with a bolted flange for closure. A 5/8" diameter hole was drilled half way up the side of the vessel and a 3/4" pipe coupling welded to the outside of the vessel around the hole. Four 1/4" holes were drilled in a vertical line on 2" centers across the vessel from the 5/8" hole. One-quarter inch pipe couplings were welded around these 1/4" holes on the outside of the vessel.

Small, loose glass wool plugs were placed in all couplings and connections installed for pumping liquid. The vessel was then filled with Pennsylvania sand, wet with a synthetic brine containing 30,000 p.p.m. sodium chloride to stimulate connate water and sealed by bolting on a blind flange. Brine was then pumped in the 5/8" hole and out the 1/4" holes until no more air was displaced. The brine was followed by a light hydrocarbon solvent until no more brine was contained in the effluent.

The flow was reversed, going into the 1/4" holes and out of the 5/8" hole, and the flow rate was measured. A permeability calculation assuming a 5/8" diameter flow path 12" long gave a value of 61.8 darcies.

Oil flow was discontinued and approximately 5½ liters of 20% AM–9 plus 30% calcium chloride was pumped into the 5/8" hole. This was followed by approximately 300 cu. ft. of nitrogen to blow the sand down to irreducible liquid saturation, sulfur dioxide gas was injected until its odor was detectable in the effluent, and the vessel was shut-in over the week-end. In practice, a shut-in time of two to four hours should be sufficient.

Oil flow was then started through the 1/4" holes with the 5/8" hole serving as the outlet. After fill up plus about 6 liters of oil, no more gas bubbles were observed in the effluent and a rate was measured. The permeability calculation as before gave a value of 50.3 darcies.

The vessel was opened and the unconsolidated sand dug out. It was found that the consolidated sand extended out in a roughly semi-circular shape for about 8" from the 5/8" hole in a horizontal direction and about 4½" in a vertical direction. All the sand was well consolidated except for the sand about half an inch radius around the 5/8" hole which was rather poorly consolidated, possibly due to the larger amount of iron salts in this area as indicated by the color. However, the 5/8" hole itself was full of the consolidated sand which stayed in place when the main body broke loose from the side of the vessel. Only a small amount of sand was present in the 3/4" nipple which was screwed into the 3/4" coupling welded around the 5/8" hole on the outside of the vessel. This sand was rather poorly consolidated with plastic containing a rather large amount of iron salts as indicated by its dark brown color. It is believed that this sand came through the glass wool plug during the initial reverse flow of oil to determine the flow rate for the initial permeability calculation.

These results indicate that sand can be consolidated behind perforations in a well by injecting approximately 1½ gallons of 20% AM–9 plus 30% calcium chloride into each perforation, displacing liquid to irreducible with an inert gas such as nitrogen, and then polymerizing the AM–9 with sulfur dioxide, for instance. The pattern of consolidation was quite uniform, however, any considerable variations in permeability could be expected to affect the uniformity. Little or no effect of gravity segregation of the heavily weighted plastic mix was evident in the consolidation pattern.

Tests were conducted to show the feasability of transporting the sulfur dioxide vapor to the plastic wet sandy material in carrier gases. The results of these tests show that air, nitrogen or natural gas can be used as a carrier gas to transport the sulfur dioxide vapor. Air may be undesirable in some instances due to the danger of creating an explosive mixture with hydrocarbon gases or vapors in a well. Nitrogen would be an example of a gas desirable from a safety standpoint.

All tests were conducted in a similar manner. A gas container was charged with a weighed quantity of sulfur dioxide, then pressured further with the carrier gas. This final pressure in all cases was above that which should have been necessary to liquefy the sulfur dioxide at room temperature of 70° to 75° F. In the meantime, a plastic tube 1" I.D. by 12" long was packed with dry Pennsylvania sand for 10" of its length. The sand was held firmly in place with filter paper circles and rubber stoppers bored for short lengths of glass tubing. The glass tubing was not allowed to protrude from the rubber stoppers on the inner ends next to the sand to prevent puncturing the filter paper circles. Tap water was pumped through this sand-packed column until all the air bubbles visible next to the plastic tube were displaced. The tap water was followed by a 20% AM–9 plus 30% calcium chloride solution. This displaced the tap water and left the sand saturated with the AM–9 solution. Nitrogen was then passed through the sand-packed tube until no more liquid was displaced. The pressured container of sulfur dioxide and carrier gas was then attached to the tube and 330 to 450 ml. of carrier gas passed through. This is equivalent to 2.6 to 3.5 s.c.f. of carrier gas to 1 cubic foot of formation. The tube was kept in a horizontal position during the entire procedure.

For the first test, the carrier gas used was air, and the gas container was a steel cylinder of approximately one gallon capacity. The container was charged with 8.89 gms. of sulfur dioxide. This weight was determined by weighing the sulfur dioxide bottle before and after charging the container and, therefore, is slightly high due to loss of sulfur dioxide in the tubing between the sulfur dioxide bottle and the gas container. The gas container was then pressured to 106 p.s.i.g. with air.

To determine if an appreciable quantity of sulfur dioxide would be carried by the air under these conditions, gas was bled out of the container through a bubbler immersed in standard iodine solution and the air collected over water in an inverted jug. By this method it was determined that 2965 ml. of air carried over 0.6376 gm. of sulfur dioxide; a ratio of 0.2150 gm. of sulfur dioxide per liter of air at atmospheric pressure.

The pressure on the container was dropped from 106 p.s.i.g. to 95.5 p.s.i.g. by removing this amount of air and sulfur dioxide. A further test was made by bubbling gas from the container slowly through 400 ml. of 20% AM–9 plus 30% calcium chloride while stirring slowly. This amount of AM–9 mix set when only sufficient gas had been bubbled through to drop the pressure on the container from 95.5 p.s.i.g. to 95.0 p.s.i.g. These tests indicated that the air was working as a carrier gas so the container was connected to a sand-packed tube in which the sand was wet with AM–9 solution. This tube was prepared as described in the previous general description of procedure. Effluent air from the tube was collected over water. Gas was introduced from the container until 330 ml. of effluent air was collected. This resulted in a pressure drop in the container from 95.0 p.s.i.g. to 93.8 p.s.i.g. Assuming the same weight of sulfur dioxide to air volume ratio as that determined by bubbling through standard iodine solution, 0.07 gm. of sulfur dioxide were carried into the tube by this volume of air. The sand at the input end of the tube had a strong odor of sulfur dioxide, while none was detectable at the outlet end. The top two-thirds of the sand in the tube was well consolidated, while the bottom one-third was poorly consolidated, indicating that the gas had passed through the top of the sand. There were a few spots near the outlet end of the tube where the sand was still saturated with AM–9 solution; nitrogen blowing did not displace the AM–9. The AM–9 was set around the edges of these spots but was still liquid in the center when the sulfur dioxide did not penetrate.

The test with nitrogen as a carrier gas was made with a stainless steel container with a capacity of approximately 360 ml. This container was evacuated and then 1.70 gms. of sulfur dioxide injected into it. Nitrogen pressure was then applied and total pressure raised to 500 p.s.i.g. The gain in weight due to pressuring with nitrogen was 12.10 gms. It was necessary to disconnect the gauge and fittings to make this weighing so a small amount of sulfur dioxide was lost. When the gauge and fittings were reconnected, pressure dropped from 500 p.s.i.g. to 475 p.s.i.g. The nitrogen-sulfur dioxide mixture was then passed through a sand-packed tube wet with 20% AM–9 plus 30% calcium chloride as in the previous test until pressure dropped to 457 p.s.i.g. A total of 0.54 gm. nitrogen and sulfur dioxide were bled out of the container. Calculations indicate that 450 ml. of nitrogen at one atmosphere pressure was used. The odor of sulfur dioxide was apparent at the outlet of the tube almost immediately after gas was started through. This indicates that the gas was being introduced more rapidly than in the previous tests and that passage was too rapid for the sulfur dioxide to be absorbed by the AM–9 solution. Flow of gas was reduced, but some sulfur dioxide was wasted. However, consolidation of the sand in this test was about the same as that in the previous test with air as the carrier gas. It is estimated that slightly less sulfur dioxide was used in this test than in the first one.

The third test used natural gas as the carrier gas and the same stainless steel container used in the nitrogen test. The container was charged with 0.90 gm. of sulfur dioxide and then pressured to 48 p.s.i.g. with natural gas. This pressure was all that could be applied with the regulator on the natural gas bottle. The weight of the natural gas used was 0.66 gm. The mixed gases were passed through a sand-packed tube wet with 20% AM–9 plus 30% calcium chloride as before until 400 ml. of the effluent natural gas was collected over water. A total of 0.58 gm. of natural gas and sulfur dioxide were bled out of the container. The sand was completely consolidated in the tube. An excess of sulfur dioxide was used as the sand throughout the tube had the odor of this gas.

The results of these tests indicate that air, nitrogen or natural gas may be used as a carrier gas to transport sulfur dioxide vapor above the liquefaction pressure of sulfur dioxide alone. The amount of carrier gas employed with the sulfur dioxide is generally an amount sufficient to maintain the sulfur dioxide in a vapor phase, thus to prevent the $SO_2$ from condensing. The amount of carrier gas in a carrier gas-$SO_2$ mixture can generally range from about 10 to 90 volume percent however the mixture should contain $SO_2$ in amounts sufficient to catalyze the resin-forming material in accordance with the present invention.

It is claimed:

1. A method for consolidating loose, sandy material to provide a permeable consolidated mass, the steps comprising placing an aqueous solution consisting essentially of a mixture of (a) about 1 to 25 weight percent of a monomeric alkylidene bisacrylamide of the formula

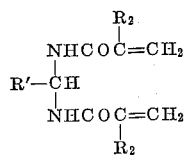

in which

is a hydrocarbon residue of an aldehyde containing from about 1 to 10 carbon atoms and $R_2$ is of the group consisting of hydrogen and methyl, and (b) about 75 to 99 weight percent of another ethylenic monomer copolymerizable with (a), into the loose sandy material in amounts sufficient to wet the surface of the particles, conducting an inert gas through the sandy material containing the resin-forming mixture to remove excess amounts of the resin-forming material while leaving the surfaces of the particles wet with said material, and contacting the loose, sandy material with a catalyst consisting essentially of vaporous catalytic amounts of sulfur dioxide to polymerize the resin-forming material, consolidate the sandy material and provide a permeable consolidated mass.

2. The method of claim 1 wherein the loose, sandy material is contacted with sulfur dioxide in amounts of about 0.01 to 10 weight percent of said resin-forming mixture.

3. The method of claim 1 wherein the bisacrylamide is N,N'methylene bisacrylamide.

4. The method of claim 3 wherein the ethylenic monomer is acrylamide, and the aqueous solution contains polymerization expediting amounts of a Group I to III metal halide.

5. The method of claim 3 wherein the loose, sandy material is contacted with sulfur dioxide in amounts of about 0.01 to 10 weight percent of said resin-forming mixture.

6. The method of claim 4 wherein the loose, sandy material is contacted with sulfur dioxide in amounts of about 0.01 to 10 weight percent of said resin-forming mixture and wherein the metal halide is present in amounts of about 5 to 35 weight percent of said aqueous solution.

7. The method of claim 1 wherein the sulfur dioxide is in gaseous form and is conducted to contact the resin-forming material in a carrier gas.

8. The method of claim 7 wherein the bisacrylamide is N,N'methylene bisacrylamide, the ethylenic monomer is acrylamide, and the aqueous solution contains polymerization expediting amounts of an inorganic Group I to III halide metal salt.

9. The method of claim 7 wherein said sulfur dioxide is present in amounts of about 0.01 to 10 weight percent of said resin-forming mixture.

10. The method of claim 8 wherein the salt is calcium chloride.

11. The method of claim 8 wherein the metal halide is present in amounts of about 5 to 35 weight percent of said aqueous solution.

12. A method for consolidating loose, sandy material to provide a permeable consolidated mass comprising placing an aqueous resin-forming solution into the loose, sandy material in amounts sufficient to wet the surface of the particles, said resin-forming material when polymerized being capable of consolidating said loose, sandy material conducting an inert gas through the sandy material containing the resin-forming mixture to remove excess amounts of the resin-forming material while leaving the surfaces of the particles wet with said material and contacting the loose, sandy material with catalytic amounts of an essentially vaporous catalytic agent capable of polymerizing said resin-forming material when contacted therewith to consolidate the sandy material and provide a permeable consolidated mass.

References Cited by the Examiner
UNITED STATES PATENTS

| | | | |
|---|---|---|---|
| 2,378,817 | 6/1945 | Wrightsman et al. | 166—33 |
| 2,801,984 | 8/1957 | Morgan et al. | 166—33 |
| 2,940,729 | 6/1960 | Rakowitz | 166—33 |
| 3,056,757 | 10/1962 | Rakowitz | 166—33 |

CHARLES E. O'CONNELL, *Primary Examiner.*

NORMAN YUDKOFF, *Examiner.*